Patented June 25, 1946

2,402,878

UNITED STATES PATENT OFFICE 2,402,878

DEHYDRATION OF SULPHUR ALCOHOLS

Thomas F. Doumani, Wilmington, Calif., assignor to Union Oil Company of California, Los Angeles, Calif., a corporation of California No Drawing. Application June 6, 1942,
Serial No. 446,058

5 Claims. (Cl. 260—609)

This invention relates to the dehydration of monohydric sulphur alcohols to obtain unsaturated thio-ethers such as vinyl ethyl thio-ether and its homologs. These products have been found useful as solvents, chemicals, or raw materials for production of resins, rubbers and plastics.

Monohydric sulphur alcohols have been produced in the past in two general ways illustrated by the following reactions.

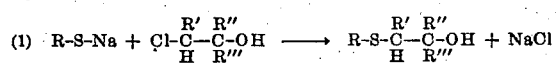

and

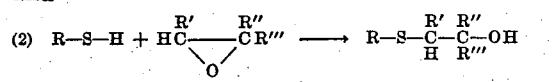

where R', R", and R''' refer to alkyl or aryl radicals or hydrogen, and P is an alkyl or aryl radical.

Briefly, it is the object of our invention to provide methods of dehydrating the above sulphur alcohols, whereby monomeric or polymeric unsaturated thio-ethers may be obtained; for example, dehydration of the products of reactions 1 and 2 to give monomeric or polymeric mono-olefin thio-ethers of the type

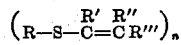

The invention resides in four types of dehydration, namely (1) thermal processes, (2) processes involving acidic or neutral dehydrating agents, (3) processes involving alkali hydroxide dehydrating agents, and (4) vapor phase catalytic dehydration processes.

It has been found that heat alone will effect substantial dehydration of sulphur alcohols. This is in marked contrast to the action of ordinary alcohols. Furthermore, heat will polymerize the olefinic products of the dehydration. This permits the combination of dehydration and concurrent polymerization, and even the combination of the three processes, of alcohol formation (according to reaction 2), dehydration and polymerization. In general, temperatures above 150° C. are required for any or all of these reactions (except the alcohol formation itself, which may be carried out at lower temperatures in most instances) and continuous removal of the product water by fractionation is desirable. Suppression of polymerization and acceleration of dehydration is promoted by use of as low temperatures as possible and adjustment of pressure to permit continuous removal, by fractional distillation, of the monomeric product as well as the water. Modifiers such as styrene for example, may be added during the course of the dehydration or polymerization, if copolymerization or modification of the resinous polymer is desired.

Acidic and neutral dehydrating agents include strong acids such as sulphuric and phosphoric (each above about 90% concentration), and partly hydrated zinc chloride (over about 80% concentration). In general, these induce dehydration at lower temperatures than those required for the thermal process, and also promote substantial polymerization of olefinic products. Again continuous removal of the monomer represses polymerization.

The action of the alkali hydroxides as dehydrating agents is unique in that rapid dehydration with essentially no polymerization of the monomeric olefin products is obtained at temperatures of about 200° C. These catalysts are particularly well suited to continuous dehydration processes, since they are not appreciably contaminated by side-reaction products, and may be used for a very long time without replacement. They are sufficiently high-boiling to permit continuous removal by distillation of both the water and the monomeric olefin product, and traces of high-boiling products of side reactions which may accumulate over a long period of time usually form a separate phase insoluble in the catalyst, which may be drawn off periodically. These catalysts are also particularly desirable in the reactions involving dehydration of relatively unstable materials which may be destroyed by heat or strong acid catalysts.

Vapor phase dehydration, using catalysts such as Activated Alumina, bauxite, clay, fuller's earth, and silica gel, is effective only at temperatures above 200° C., and is accompanied by considerable polymerization. The degree of polymerization may be controlled to a considerable extent by regulation of the temperature and pressure and by use of inert gases as diluents or carriers, in general low temperatures, low pressures and diluents having the effects of depressing polymerization.

Two monohydric sulphur alcohols were prepared as shown in the following reactions in which approximately theoretical quantities of the reactants were heated at 70° C. to obtain quantitative yields of the product.

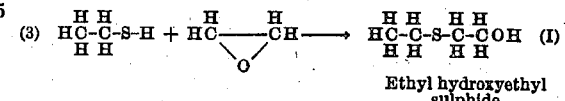

Ethyl hydroxyethyl sulphide

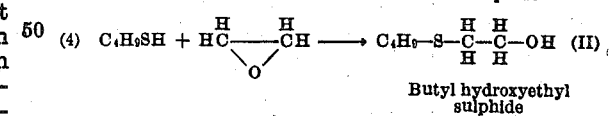

Butyl hydroxyethyl sulphide

*Example 1.—Thermal process*

Reaction No. 4 was carried out in a stainless steel bomb at 150° C. for three hours. Analysis of the product revealed that under these conditions about half of the reactants remained unchanged, the remaining half having formed about equal amounts of the monomeric butyl vinyl sulphide and a low polymer.

*Example 2.—Acid catalysts*

Ten ml. of sulphur alcohol No. I and 1 ml. of concentrated sulphuric acid were heated to 135° to 140° C. for a half hour. The product consisted of approximately 50% of dimeric and trimeric ethyl vinyl sulphide and 50% of higher polymers. A similar experiment with metaphosphoric acid gave a slower dehydration, with greater polymerization.

*Example 3.—Zinc chloride*

Ten ml. of sulphur alcohol No. I was heated to 150° C. with 10 g. of anhydrous $ZnCl_2$. After about 5 minutes, during which the mixture became a clear homogeneous solution, the temperature was raised to 250° and a distillate fraction was taken, which proved to consist of about 50% of monomeric ethyl vinyl sulphide, and 50% low polymers.

*Example 4.—Alkaline catalyst, batch process*

Ten ml. of sulphur alcohol No. I plus 10 g. of solid potassium hydroxide pellets were heated at 190° C. to 220° C. for twenty minutes. Water formed in the reaction boiled off during this period, and the remaining liquid stratified into two layers. The upper oily layer was removed by decantation, and was distilled to obtain a yield of about 80% of exclusively monomeric ethyl vinyl sulphide boiling at 91.3° C. (uncorrected). The 20% residue was unchanged alcohol which was returned to the original vessel with the KOH layer, and re-heated to the original temperature of about 200° C. for another 20 minutes, at which time it was found that as nearly as could be observed, all of the original alcohol had been converted to monomeric ethyl vinyl sulphide.

*Example 5.—Alkaline catalyst, continuous process*

An arrangement of apparatus was made whereby 10 g. of solid KOH was heated to about 200° C., while sulphur alcohol No. I was added at a rate of about 1 ml./min., and water and monomeric ethyl vinyl sulphide were removed continuously through a fractionating column. After about an hour an equilibrium was established at which the rate of production was approximately equal to the rate of feed. No appreciable deterioration of the catalyst was observed in several hours of operation.

*Example 6.—Vapor phase catalytic dehydration*

Three experiments were conducted using 50 ml. of granular aluminum oxide catalyst at atmospheric pressure and temperatures of 325° C., 250° C., and 210° C., respectively, employing sulphur alcohol No. I as the feed at feed rates (in volumes per volume of catalyst per hour) of 1, 1, and 0.5 respectively. The product of the run at the highest temperature 325° C. was found to consist largely of polymers of ethyl vinyl sulphide; the product of the 250° C. run was found to contain appreciable amounts of unreacted feed; and the product obtained at 210° C. was entirely unchanged feed. A fourth run was made using the same catalyst at 300° C., and diluting the feed with an equimolal quantity of nitrogen. This gave substantially complete dehydration to monomeric as well as polymeric ethyl vinyl sulphide.

The above examples are merely illustrative of the simpler reactions and processes which I may employ. It is obvious that many modifications of the above processes may be used without departing from the scope of the invention as defined by the following claims.

I claim:

1. A process for the dehydration of sulphur alcohols to form unsaturated thio-ethers which comprises subjecting a sulphur alcohol having the formula:

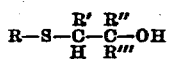

where R', R'', and R''' are selected from the class consisting of alkyl, aryl, and hydrogen groups, and R is selected from the class consisting of alkyl and aryl groups, to a temperature above about 150° C. for a time sufficient to dehydrate said sulphur alcohol with the formation of water and an unsaturated thio-ether, and continuously distilling off said water and unsaturated thio-ether as formed.

2. A process for the dehydration of sulphur alcohols to produce unsaturated thio-ethers which comprises contacting a sulphur alcohol having the formula:

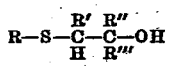

where R', R'', and R''' are selected from the class consisting of alkyl, aryl, and hydrogen groups, and R is selected from the class consisting of alkyl and aryl groups, with a catalyst maintained at a temperature above about 150° C. for a time sufficient to dehydrate said sulphur alcohol with the formation of water and an unsaturated thio-ether, and continuously distilling off said water and unsaturated thio-ether as formed.

3. A process for the dehydration of sulphur alhohols to produce unsaturated thio-ethers which comprises contacting a sulphur alcohol having the formula:

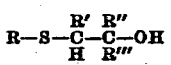

where R', R'' and R''' are selected from the class consisting of alkyl, aryl, and hydrogen groups, and R is selected from the class consisting of alkyl and aryl groups, with a solid alkali metal hydroxide maintained at a temperature above about 150° C. for a time sufficient to dehydrate said sulphur alcohol with the formation of water and an unsaturated thio-ether, and continuously distilling off said water and unsaturated thio-ether as formed.

4. A process for the dehydration of a sulphur alcohol with the formation of an unsaturated thio-ether which comprises contacting an alkyl hydroxyethyl sulphide with a solid alkali metal hydroxide maintained at a temperature of above about 150° C. while continuously distilling off water and the unsaturated thio-ether as formed.

5. A process for the dehydration of ethyl hydroxyethyl sulphide which comprises contacting said sulphide with solid potassium hydroxide maintained at about 200° C. while continuously distilling off water and ethyl vinyl sulphide as formed.

THOMAS F. DOUMANI.